3,606,520
Filed
2 Sheets-Sheet 1
FIG. 1.
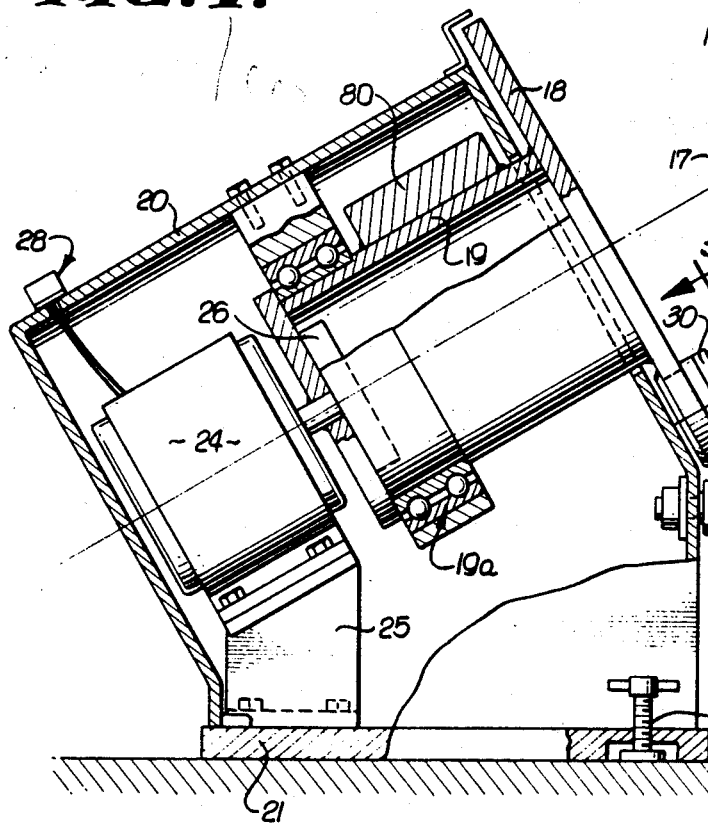
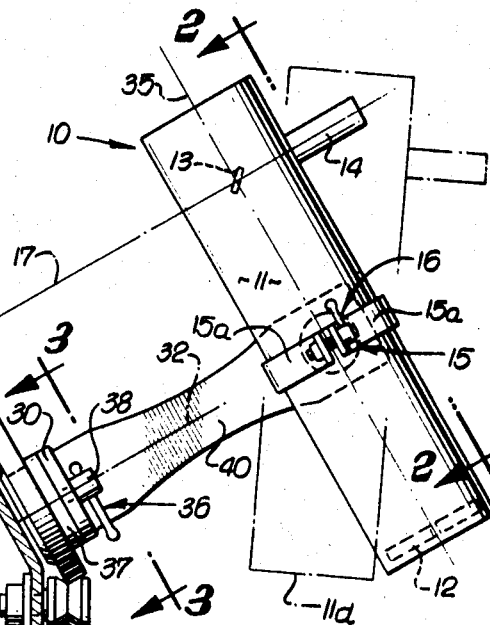
FIG. 6.
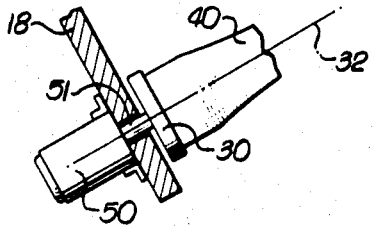
FIG. 2.
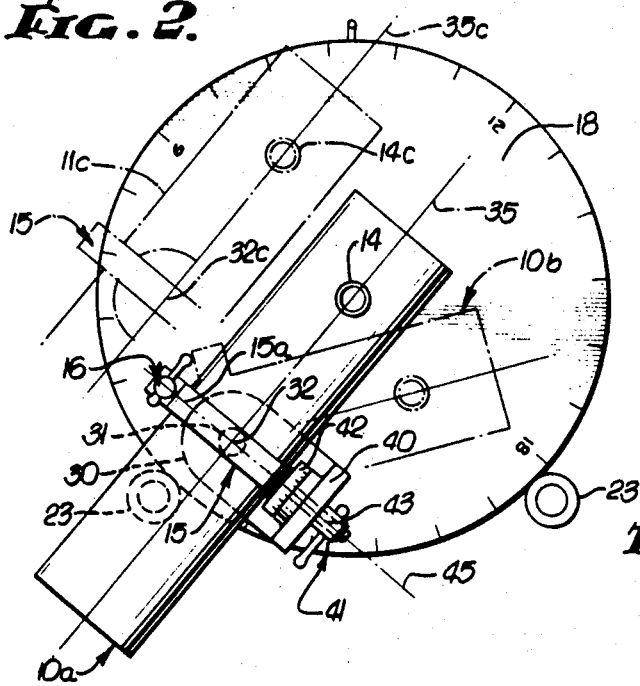
FIG. 7.
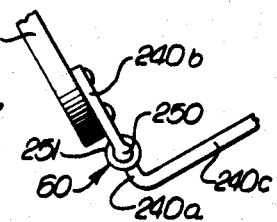
INVENTOR.
THOMAS B. ROCKWELL
BY White & Haefliger
ATTORNEYS.

Sept. 20, 1971 T. B. ROCKWELL 3,606,520
TRACKING INSTRUMENT MOUNT
Filed Sept. 30, 1968 2 Sheets-Sheet 2
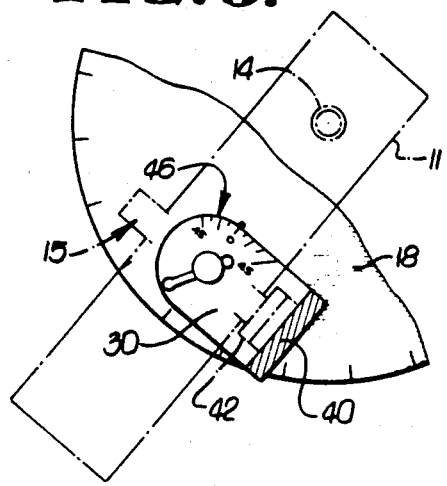
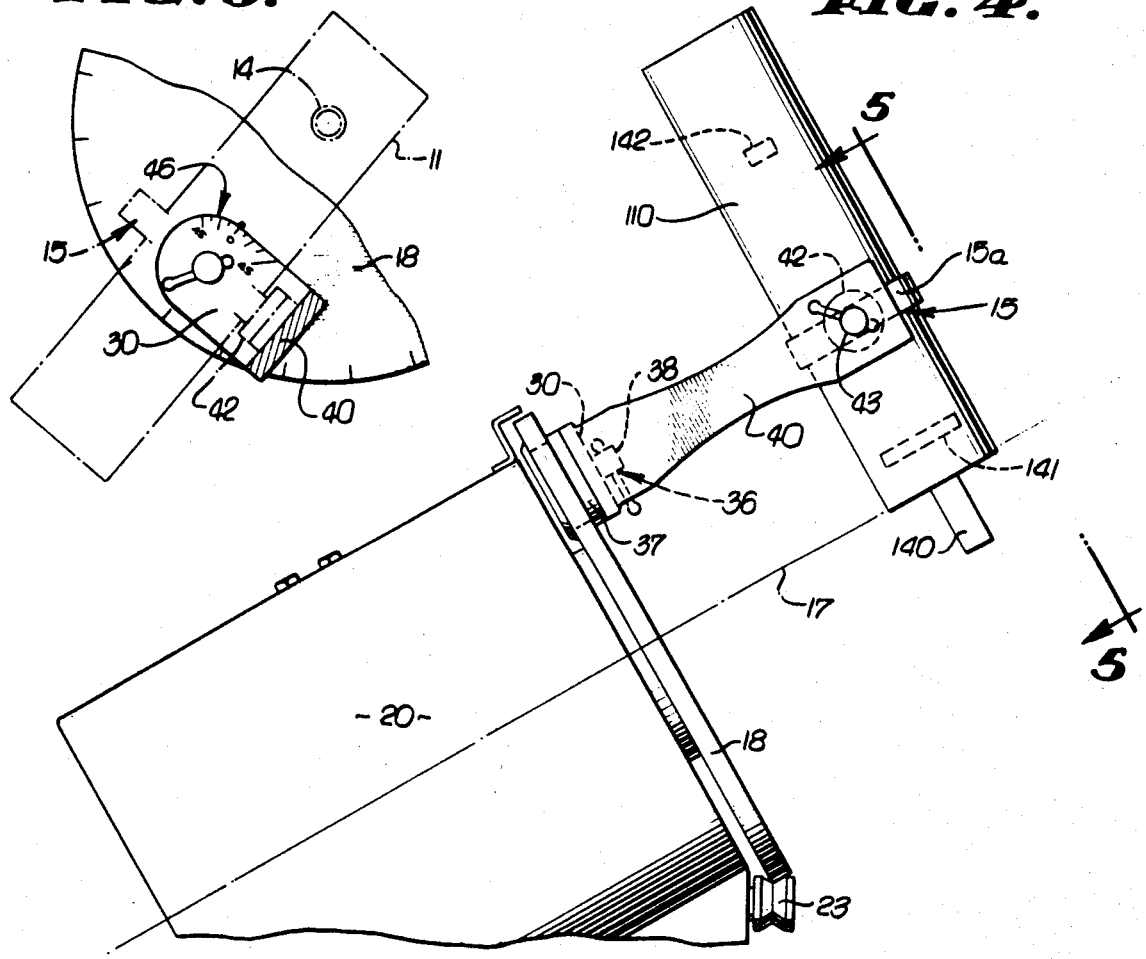
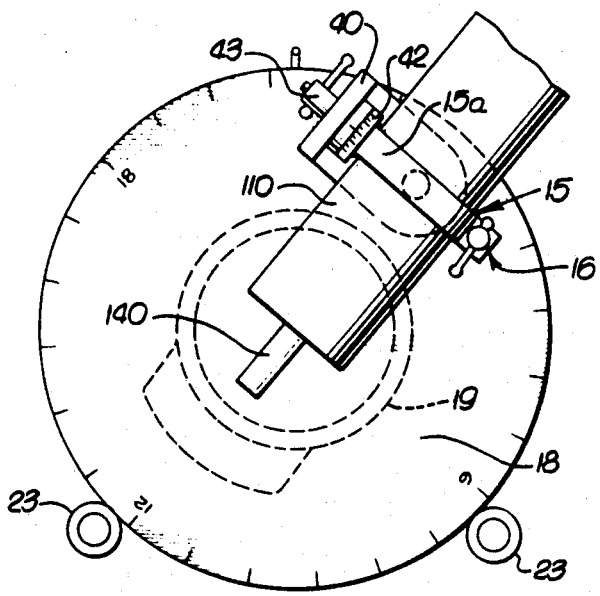
INVENTOR.
THOMAS B. ROCKWELL
By White & Haefliger
ATTORNEYS.

United States Patent Office 3,606,520
Patented Sept. 20, 1971

3,606,520
TRACKING INSTRUMENT MOUNT
Thomas B. Rockwell, 2318 Rockinghorse Road,
Miraleste, Calif. 90731
Filed Sept. 30, 1968, Ser. No. 763,633
Int. Cl. G02b 17/00
U.S. Cl. 350—6
1 Claim

ABSTRACT OF THE DISCLOSURE

The disclosure concerns a mount for an instrument used in tracking celestial objects, and enabling comfortable sustained viewing by the observer using the instrument, for extended time periods.

BACKGROUND OF THE INVENTION

This invention relates generally to instruments used in tracking objects such as planets, stars or satellites. More specifically, the invention concerns mounts for such instruments.

In the past, tracking instruments used by human observers have presented certain operational difficulties having to do with necessary changes in instrument location during tracking. For example, in the use of small telescopes, the observer must constantly shift his position as the telescope automatically tracks a star or planet in its course across the sky; further, it frequently happens that the eyepiece changes position between points close to ground level to points higher than the observer's eye level in standing position during the course of an evening's observation. Such problems are further magnified during tracking of fast moving satellites using tracking instruments. These problems are even further complicated when it is desired to shift the instrument observation direction back and forth between multiple objects in space, with speed and accuracy.

SUMMARY OF THE INVENTION

It is a major object of the invention to provide a solution to the above problems and difficulties characterized in that an observer may set the eyepiece of the instrument in or near the north-directed alignment axis of the instrument and at the same time maintain the eyepiece at a comfortable level where he may want it for sustained comfortable viewing of one or more objects in the sky. Basically, the invention is embodied in a combination that includes a holder for the tracking instrument, rotary apparatus rotatable about a first axis and at a predetermined rate, and means carried by that apparatus and including an arm supporting the holder to be rotated about the first axis, the arm and apparatus having pivot connection defining a second axis parallel to and offset from the first axis and about which the arm is swingable to selectively locate the instrument at any position within a range of positions relative to the rotary apparatus without disturbing holder rotation about the first axis. Accordingly, the provision of dual axes facilitates setting of the eyepiece at a comfortable level which may be maintained as the earth rotates.

While the instrument may broadly comprise a tracking device, one form of same comprises a telescope which may for example have an eyepiece located proximate the first or principal axis; also, the telescope may have an elongated body shiftable lengthwise to facilitate placement of the eyepiece near the axis in the different arm positions are referred to, the eyepiece being at one end of the body (Cassegranian) or at the side of the body (Newtonian).

Additional objects and advantages of the invention include the provision of an adjustable pivot connection between the holder and arm and defining a third axis generally normal to the second axis and about which the holder and telescope are rotatable relative to the arm; and the provision of a drive connected to slowly rotate the apparatus one about the main axis and at a rate corresponding to the earth's rotation rate, the drive including a clutch to free the apparatus for adjustable rotation about the main axis in conjunction with rotary adjustment of the arm as referred to above, to give the viewer most advantageous access to the instrument eyepiece.

These and other objects and advantages of the invention, as well as the details of an illustrative embodiment, will be more fully understood from the following detailed description, in which:

FIG. 1 is a side elevation of telescope mechanism incorporating the invention;
FIG. 2 is a view taken on line 2—2 of FIG. 1;
FIG. 3 is a section taken on line 3—3 of FIG. 1;
FIG. 4 is a view showing application of the invention to a Cassegranian telescope;
FIG. 5 is a view taken on line 5—5 of FIG. 4;
FIG. 6 is a fragmentary view showing a modification; and
FIG. 7 is a fragmentary view of still another modification.

DESCRIPTION OF PREFERRED EMBODIMENT

While the invention has utility with different forms of tracking instruments, it finds particularly advantageous utility in connection with use of a telescope, one form of which is seen at 10 in FIG. 1. The latter has an elongated cylindrical body or barrel 11, a light collecting mirror 12, a 45-degree mirror 13 and an eyepiece 14 at one side of the body. A holder for the telescope or instrument may take the form of the clamp 15, it being understood that various types of holders may be used. The clamp 15 has sections 15a embracing the telescope and allowing shifting of the barrel 11 lengthwise upon loosening of the screw fastener 16.

Rotary apparatus is provided to be rotatable about a first axis, such as axis 17, at a predetermined rate, as for example at the same rate as earth's rotation (360 degrees each 24 hours). Merely as illustrative, such apparatus may take the form of a rotary plate 18 having a principal axis 17 and mounted at one end of the barrel 19. The latter is bearing supported at 19a within a housing 20 supported on a base 21, which may be tilted, as by a jack screw 22, to accomplish tilting of axis 17 in order to align it parallel to the earth's axis of rotation, as for example by pointing polar axis 17 toward the North Star. Additional support for the rotary apparatus is provided by the rollers 23 carried by housing 20 and peripherally engaging the lower boundary of the plate 18, as illustrated.

A drive is provided, as for example is illustrated by motor 24, and connected to slowly rotate the apparatus about axis 17 at the predetermined rate. Motor 24 is suitably carried at 25 on base 21. Such drive is through a clutch 26 to couple and de-couple the drive to the rotary apparatus. The operator may forcibly rotate plate 18 to thereby effect de-coupling, and coupling is automatic in the absence of such forcing. When de-coupled, the plate 18 may be freely rotated about the axis 17 as during adjustment of the eyepiece 14 to comfortable viewing level, proximate axis 17. When coupled, the plate 18 is blocked against rotation about axis 17, except in response to rotation of the drive. A drive speed control is seen at 28.

In accordance with an important aspect of the invention, means is provided to be carried by the rotary apparatus and including an arm (as for example arm 30) supporting the holder 15 to be rotated about the first axis 17. In this regard, the arm 30 and rotary apparatus have pivot connection, as at 31, defining a second axis 32 parallel to and offset from the first axis. Further, arm 30 is swingable about axis 32 to locate the tracking instrument at any position within a range of positions relative to the rotary apparatus without disturbing holder rotation about axis 17 by the rotary apparatus. See in this regard the full line and broken line positions 10a and 10b of the telescope 10 in FIG. 2 as being representative of two such positions, the eyepiece 14 being at the axis 17 in position 10a, and near that axis in position 10b. These two positions represent two different viewing directions, as for example to observe two different stars, and then the apparatus allows accurate shifting of viewing for different stars along the rotary direction of travel of plate 18, without disturbing the plate. See in this regard the angular graduations 46 on arm 30 in FIG. 3.

Note also that the eyepiece can be raised (to broken line position 14c) while being maintained near axis 17, the same viewing direction being maintained. To accomplish this, the plate 18 is rotated, after decoupling clutch 26, to bring axis 32 into position 32c in FIG. 2. The viewing direction of telescope body 11 is maintained the same however, as represented by position 11c, such viewing direction being defined by the axes 35 and 35c of the bodies 11 and 11c. For this purpose, clamp or lock 36 is released to permit turning of arm 30, and than re-tightened. In this regard, the clamp may have a part which threads into the structure 37 on the plate 18, the clamp head 38 tightening against arm 30.

The arm 30 is connected to the holder 15 as by the elongated member 40 of sufficient length that the end of the telescope may be swung past the clamp 36. Such swinging is facilitated by connection of the holder 15 to the member 40 via a rotary clamp 41. The latter may have a part threaded into the holder bore 42 so that the head 43 may be tightened against member 40, as seen in FIG. 2. When clamp 41 is loosened, the holder and telescope may be rotated about axis 45 in FIG. 2, and as further represented by the solid and broken line positions 11 and 11d in FIG. 1, eyepiece being maintainable near axis 17. Accordingly, the member 40 and telescope holder 15 have pivot connection adapted to be tightened to prevent pivoting. Axis 45 is generally normal to axis 17 and 32, and such swinging of the telescope adjusts the elevation of the viewing direction between north alignment and the equator.

FIGS. 4 and 5 illustrate the same structure as described above, excepting for the telescope which is of Cassegranian type with the eyepiece 140 at one end of the tubular body 110 instead of at the body side. In this case, the large mirror 141 is apertured to pass light which has been reflected off mirror 141 to small mirror 142, and re-reflected to the eyepiece. Note that the eyepiece may be kept near axis 17 for a variety of angular positions of plate 18, arm 30 and telescope body 110, as well as lengthwise shifted positions of body 110 relative to holder 15, in order that the eyepiece does not shift position greatly during rotation of plate 18. Also, the height of eyepiece 140 may be adjusted for compatible viewing.

FIG. 6 illustrates the provision of a motorized drive 50 mounted on plate 18, and connected as by shaft 51 to the arm 30 to controllably rotate it about axis 32.

FIG. 7 illustrates an additional pivot 60 allowing relative rotation of section 240a of modified member 240 (corresponding to member 40 above) about axis 250, which is normal to axes 17 and 32. Section 240c carries the holder 15, whereas section 240b is carried by arm 30. An adjustable link or clamp 251 clamps the sections in selected angularity, affording an additional degree of adjustment to the system.

Referring back to FIG. 1, a counterweight 80 is shown on the drum in a position to balance the rotary assembly about the axis of rotation.

I claim:
1. In combination with a telescope having an eyepiece, a mount comprising, in combination,
    a holder for the telescope,
    rotary apparatus rotatable about a first-polar axis at a predetermined rate,
    and means carried by said rotary apparatus and including an arm supporting the holder to be rotated about said first axis by said apparatus, the arm and said apparatus having pivot connection defining a second axis remaining generally parallel to and offset from the first axis and about which the arm is swingable to selectively locate the instrument at any position within a range of positions, said axes extending generally in angular offset relation from both vertical and horizontal, and said eyepiece remaining proximate said first axis during rotation of said apparatus, the spacing between the first and second axis being approximately equal to the spacing between said eyepiece and said holder, the telescope has an elongated tubular body, the body and holder having adjustable interconnection characterized in that the body is shiftable lengthwise relative to the holder in different positions of said arm, wherein said means includes an adjustable pivot connection between the holder and arm and defining a third axis generally normal to said second axis and about which the holder and telescope are rotatable relative to said arm with the eyepiece remaining proximate the first polar axis, said telescope having upper and lower positions in each of which the telescope has the same general viewing direction, and between which the instrument is shiftable in response to combined rotation of said apparatus about said first axis and rotation of said arm about said second axis.

References Cited
UNITED STATES PATENTS

| | | | |
|---|---|---|---|
| 471,708 | 3/1892 | Rudall | 350—83X |
| 2,693,032 | 11/1954 | Braymer | 350—82X |
| 3,386,277 | 6/1968 | Hennings | 350—82UX |
| 1,607,688 | 11/1926 | Perrin et al. | 350—85 |
| 2,326,552 | 8/1943 | Morse | 350—85 |
| 3,063,343 | 11/1962 | Kaestner | 350—85X |
| 3,257,728 | 6/1966 | Blomquist | 350—85X |

FOREIGN PATENTS

| | | | |
|---|---|---|---|
| 21,132 | 1/1894 | Great Britain | 350—85 |

DAVID SCHONBERG, Primary Examiner

M. J. TOKAR, Assistant Examiner

U.S. Cl. X.R.

350—85